US012280707B2

(12) United States Patent
Gros et al.

(10) Patent No.: US 12,280,707 B2
(45) Date of Patent: Apr. 22, 2025

(54) UTILITY DECK STORAGE DEVICE

(71) Applicant: Highway Products, Inc., White City, OR (US)

(72) Inventors: Eugene Washington Gros, Eagle Point, OR (US); Charles P. Gros, White City, OR (US)

( * ) Notice: Subject to any disclaimer, the term of this patent is extended or adjusted under 35 U.S.C. 154(b) by 187 days.

(21) Appl. No.: 18/142,269

(22) Filed: May 2, 2023

(65) Prior Publication Data

US 2023/0271543 A1    Aug. 31, 2023

Related U.S. Application Data

(60) Provisional application No. 63/347,633, filed on Jun. 1, 2022.

(51) Int. Cl.
*B60P 3/14* (2006.01)
*B60R 9/06* (2006.01)
*B60R 11/06* (2006.01)
*B60R 11/00* (2006.01)

(52) U.S. Cl.
CPC .............. *B60P 3/14* (2013.01); *B60R 9/065* (2013.01); *B60R 11/06* (2013.01); *B60R 2011/004* (2013.01); *B60R 2011/0059* (2013.01)

(58) Field of Classification Search
CPC ............. B60P 3/14; B60R 9/065; B60R 11/06
USPC ................... 296/37.6; 224/403–405
See application file for complete search history.

(56) References Cited

U.S. PATENT DOCUMENTS

| 3,245,713 | A |   | 4/1966 | Ogilvie |
| 4,103,956 | A |   | 8/1978 | Faulstich |
| 4,247,144 | A |   | 1/1981 | Radek |
| 4,418,854 | A |   | 12/1983 | Buckley |
| 4,733,898 | A |   | 3/1988 | Williams |
| 4,789,195 | A |   | 12/1988 | Fletcher |
| 5,505,153 | A |   | 4/1996 | Poole |
| 5,511,848 | A | * | 4/1996 | Mobley ............. B62D 25/2054 296/183.1 |
| 5,564,773 | A | * | 10/1996 | Lapsley .................... B60P 3/40 296/100.06 |
| 5,590,925 | A | * | 1/1997 | Banks, Sr. ............... B60J 5/067 296/24.45 |
| 5,593,201 | A |   | 1/1997 | Bateman |
| 5,593,272 | A | * | 1/1997 | Green ....................... B60P 1/04 414/498 |
| 5,845,952 | A |   | 12/1998 | Albertini et al. |

(Continued)

FOREIGN PATENT DOCUMENTS

WO    WO2021195690    10/2021

*Primary Examiner* — Justin M Larson
(74) *Attorney, Agent, or Firm* — Jerry Haynes Law

(57) ABSTRACT

A utility storage deck device 100 for a vehicle 200 comprises a load bearing bed cover 102, storage boxes 104, a headache rack 106, a primary deck 108 and a secondary deck 110. The load bearing bed cover 102 is configured to detachably mounted on the bed rails 112 of the vehicle 200. The storage boxes 104 are mounted to the top of the bed cover 102 on the passenger side 105a and driver side 105b, leaving space for cargo on top of the bed cover 102 between the boxes 104 to act as a secondary deck 110, while the bed cover 102 covering the space between the bed cover 102 and the OEM tailgate 114 to turn the space into a primary deck 108 to provide a secured and covered storage space. The utility deck storage device 100 that configured to detachably attach on the bed rails 112 of the vehicle 200.

15 Claims, 12 Drawing Sheets

(56) References Cited

U.S. PATENT DOCUMENTS

| | | | |
|---|---|---|---|
| 6,089,639 A | | 7/2000 | Wojnowski |
| 6,253,976 B1 | * | 7/2001 | Coleman ................. B60R 11/06 224/310 |
| 6,626,480 B2 | | 9/2003 | Anderson |
| 7,464,978 B1 | | 12/2008 | Meeks |
| 7,731,026 B2 | | 6/2010 | Harrison |
| 7,753,425 B2 | | 7/2010 | Niedziela et al. |
| 9,073,499 B1 | | 7/2015 | Erickson |
| 9,272,740 B1 | * | 3/2016 | Portenier ................. B62D 33/02 |
| 10,377,314 B1 | | 8/2019 | Peterson |
| 10,391,919 B2 | | 8/2019 | Hemphill et al. |
| 10,513,228 B2 | | 12/2019 | Steele et al. |
| 10,940,744 B1 | * | 3/2021 | Nadeau ................. B60J 7/1621 |
| 11,186,235 B2 | | 11/2021 | Klatt |
| 11,396,256 B2 | * | 7/2022 | York .................... B62D 65/024 |
| 11,845,384 B2 | * | 12/2023 | Harkins .................... B60R 9/02 |
| D1,041,388 S | * | 9/2024 | Gros ............................. D12/414 |
| 2003/0011180 A1 | | 1/2003 | Coffman et al. |
| 2005/0146151 A1 | | 7/2005 | Walker |
| 2006/0279099 A1 | | 12/2006 | Ranka et al. |
| 2010/0206666 A1 | | 8/2010 | Jeeves |
| 2018/0029454 A1 | | 2/2018 | Freitas |
| 2018/0134132 A1 | | 5/2018 | Nania |
| 2023/0271543 A1 | * | 8/2023 | Gros ....................... B60R 11/06 224/402 |

\* cited by examiner

UTILITY DECK STORAGE DEVICE

CROSS-REFERENCE TO RELATED APPLICATIONS

This application claims priority from U.S. Provisional Application Ser. No. 63/347,633, entitled "Utility Deck Storage Device", filed on Jun. 1, 2022, which application is hereby incorporated herein by reference in its entirety.

FIELD OF THE INVENTION

The present invention relates to a storage device for a vehicle. More so, the present invention relates to a utility deck storage device providing easy assemble and disassemble from a vehicle and providing easy storage space management.

BACKGROUND OF THE INVENTION

The following background information may present examples of specific aspects of the prior art (e.g., without limitation, approaches, facts, or common wisdom) that, while expected to be helpful to provide additional aspects of the prior art, is not to be construed as limiting the present invention, or any embodiments thereof, to anything stated or implied therein or inferred thereupon.

Pickup trucks and other vehicles having a cargo bed are widely used as service trucks. Cargo bed of the service truck is equipped with numerous storage units to utilize the cargo bed of a pickup truck in a more efficient manner.

Although many of the prior art storage units have achieved varying degrees of success, the pickup truck usually be altered structurally in some manner to accommodate the storage unit by drilling holes through the bed floor or the side panels of the pickup truck for receiving a bolt which is utilized to secure the storage unit to the pickup truck or welding the storage unit to the pickup truck whereby the storage unit is permanently fixed to the pickup truck.

While connecting the storage unit to the pickup truck in this manner ensures the storage unit is secured in the bed of the pickup truck, structural alterations to a pickup truck have a detrimental effect on the resale value of a pickup truck. Further, there are many occasions when it would be desirable to remove the storage unit from the pickup truck.

Numerous attempts have been made and several prior art devices are known that may be suitable for the specific purposes to which they address, however, they would not be as suitable for the purposes of the present invention.

For example, U.S. Pat. No. 5,845,952 to Michael et al. discloses a storage unit for a vehicle having a cargo bed defined by a floor and a plurality of side panels, each side panel having a top end and a downward extending flange. Further the storage unit comprises a plurality of cabinets and drawers that are removably secured to the vehicle without structurally altering the vehicle.

U.S. Pat. No. 5,505,153 to Veazey Sidney E. describes a twin-hulled boat having twin hull means attached to a solid deck structure that descends vertically downward from its lower surface, said boat is dimensioned to fit transportably and removably in an upright position atop a vehicle body having an open bed and sidewalls to form a closure therefor.

U.S. Pat. No. 7,942,295 to John, teaches a glazier rack and tool chest apparatus for transporting large glass pieces and glazier's tools for use in combination with a truck bed having hollows and ridges. It also suggests that tracks affixed to the truck bed and track slides affixed to the base are removably and slidingly engaged for easy removal of the apparatus for multi-use of the truck bed.

U.S. Pat. Application No. 20050146151 to Walker Eric L discloses a locking mechanism comprising a deadbolt lock comprising a hooked dead bolt and an engaging device, and a means for engaging said hooked deadbolt with said engaging device.

U.S. Design Pat. No. D373988 to Johnson Lynn M discloses an ornamental design for a utility body for a vehicle.

U.S. Pat. No. 4,789,195 to Fletcher Nevin R discloses a tool and supply box suitable to mount upon the edge of a pickup truck bed wherein it encompasses drawers and compartments both above the bed and within a space between the fender well, the inner edge and the back of the truck bed side.

U.S. Pat. No. 4,733,898 to Williams Scottie D discloses a combination storage unit and liner assembly for mounting onto the bed of a pickup truck in nesting engagement with the side panels and end panel of the truck bed. The storage unit covers the entire accessible area of the pickup bed, with the space between the auxiliary bed liner and the truck bed being partitioned to provide multiple storage compartments.

U.S. Pat. No. 4,705,317 to Henri Denis R discloses a container for mounting on the platform/bed of a truck comprises a two elongated container with sloped lid on either sides of the truck bed.

U.S. Pat. No. 3,245,713 to Ogilvie Douglas A discloses a novel and useful body construction adapted primarily for mounting on the frame of a pickup truck comprising numerous individual compartments that provides a large amount of usable space for carrying and storing various forms of special equipment and parts.

PCT published Pat. Application No. WO2021195690A1 to Reynolds Grant discloses a cargo tray for mounting to a vehicle, wherein the cargo tray comprises a deck panel that is configured to support at least a mounting arrangement for securing the cargo tray with respect to the vehicle.

It is apparent now that numerous innovations that are adapted to a variety of storage unit or arrangement made to a vehicle for providing space management to increase storage and transportation capacity of the vehicle have been previously developed in the prior art that are adequate for various purposes. Furthermore, even though these innovations may be suitable for the specific purposes to which they address, accordingly, they would not be suitable for the purposes of the present invention as heretofore described to be used in a detachable utility deck storage device for a vehicle. Thus, a quick and non-invasive mountable and detachable utility deck storage device providing easy assemble and disassemble from a vehicle with quick storage management is needed.

SUMMARY OF THE INVENTION

The present invention relates to a utility deck storage device that comprises a load bearing bed cover for a pickup truck with storage boxes, headache rack and secondary tailgate. The storage boxes are mounted to the top of the bed cover on the passenger and driver side, leaving space for cargo on top of the deck between the boxes. The headache rack is positioned between the boxes on the cab side, acting as a barrier to prevent stowed objects on the deck from colliding with the cab. The tailgate is attached to the rear face of the boxes and hinges downward, opening access to the deck area and providing a barrier from the rear opening. The deck is secured to the truck by turnbuckles attached to the four tie-down points in each corner of the pickup bed. With the OEM tailgate closed and locked on the pickup truck, the space beneath the deck turns into secure storage, like a traditional bed cover. Further, the boxes above the deck also produce side-access storage for additional equipment, tools, etc. The device of the present invention is designed to convert the bed of pickup truck into a versatile storage solution, specifically targeting the work truck industry. Further, the utility deck storage device can be configured/customized with ladder racks, drawers, full enclosures and more.

The utility deck storage device has more secure storage than a comparable service body without the requirement for the bed of a pickup truck to be removed. The installation process is non-invasive and does not require fuel lines to be rerun, rewired for lights, or relocation of bed technology like sensors and back up cameras. It also allows for taillight technology like the Ford BLIS system to be retained, which otherwise becomes obsolete. There are a wider variety of trucks that the utility deck storage device can be installed on compared to a service body. F150's, as an example, are not permitted for service bodies to be installed without losing factory warranties. Mid-size trucks like Toyota Tacomas and Ford Rangers can also be converted into work trucks with the utility deck storage device of the present invention.

According to an aspect of the present invention, a utility deck storage device for a vehicle, wherein the utility deck storage device comprises: a bed cover, wherein the bed cover is configured to detachably mounted on bed rails of the vehicle; one or more storage boxes, wherein the storage boxes are mounted to the top of the bed cover on the passenger side and driver side, leaving space for cargo on top of the bed cover between the boxes to act as a secondary deck, further, the bed cover covering the space between the bed cover and OEM tailgate of the vehicle to turn the space into a primary deck to provide a secured and covered storage space, at least one utility gate attached to the rear side of the secondary deck; an OEM utility gate and the bed cover allows the usable space of the primary deck to act as a weather proof storage space to provide secured storage and access to the cargo from the primary deck; a headache rack, wherein the headache rack is positioned between the boxes on the cab side, acting as a barrier to prevent stowed objects on the deck from colliding with the cab of the vehicle 200; and at least four turnbuckles detachably attached to the four tie down points in each corner of the bed cover of the vehicle at the lower portion of the utility storage deck device to provide detachable attachment of the utility storage deck device to the vehicle 200.

According to another aspect of the present invention, the utility deck storage device comprises a cargo rack.

According to another aspect of the present invention, the primary deck of the utility deck storage device comprises trays, drawers, removable storage boxes, at least one basket 134, storage space for cylindrical objects 138 and many more.

One objective of the present invention is to provide a utility deck storage device 100 for vehicles providing its easy and quick installation and storage space management.

Another objective of the present invention is to provide a utility deck storage device 100 for vehicle comprising a load bearing bed cover 102 with storage boxes 104 and a headache rack 106 configured to form a secondary deck 110, wherein the load bearing bed cover 102 is configured to detachably installed on top of the bed rails 112 to convert the OEM tailgate 114 of the vehicle into an enclosed and secured primary deck 108 of the vehicle 200.

Another objective of the present invention is to provide a utility deck storage device 100 to create double decks, thereby providing larger storage space for a vehicle 200 such as a pick-up truck.

Yet another objective of the present invention is to provide a utility deck storage device 100 having side openable storage boxes allowing easy and quick access to components or cargo stored in the boxes 104.

Another objective of the present invention is to provide a utility deck storage device 100 having multiple trays, 126, drawers 128, removable storage boxes 130 for easy and quick access to components or cargo stored in the device 100.

Yet another objective of the present invention is to provide a utility deck storage device 100 that does not require any lengthy and invasive vehicle modifications to install the device 100.

Another objective of the present invention is to provide a utility deck storage device 100 allows easy and quick transfer of the device 100 to the next vehicle for complete transfer of the assets that is the entire utility deck storage device 100 with the cargo stored in it.

Another objective of the present invention is to provide a utility deck storage device 100 that is configured and customized with overhead racks 124 such as cargo rack.

These and other objectives, advantages and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1A to FIG. 7B. Furthermore, there is no intention to be bound by any expressed or implied theory presented in the preceding technical field, background, summary, or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

In the prior art there were no bed covers or tonneau covers for vehicles that had boxes mounted on top of them. There are bed covers that have boxes underneath, but the boxes are not top mounted, thereby wasting the original available space of the tailgate of the vehicle. Further there are also bed covers designed for materials to be mounted above them, but not contained inside storage boxes mounted above the bed cover of the tailgate. No bed covers or tonneau covers have a secondary deck to secure the storage on top of the primary deck, which is readily detachably attached for easy and quick loading, unloading and management of cargo.

Figure 6A:
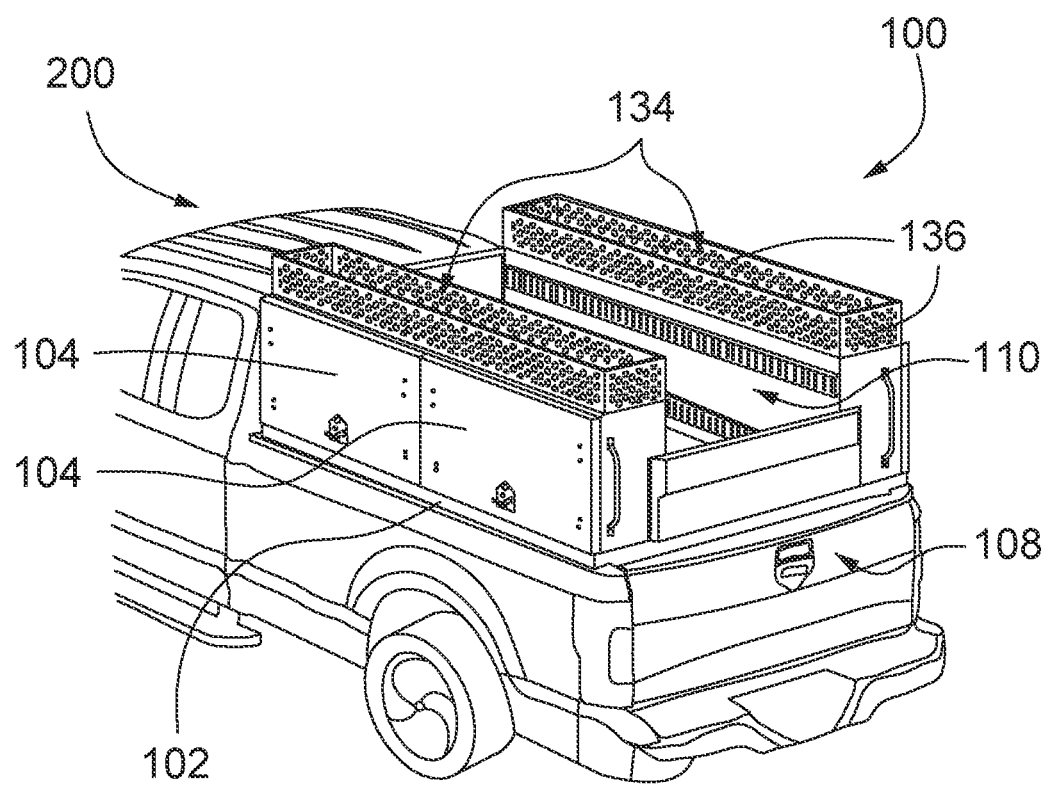
FIG. 6A illustrates a top perspective view of the exemplary utility deck storage device comprising baskets, in accordance with an embodiment of the present invention.
Figure 6B:
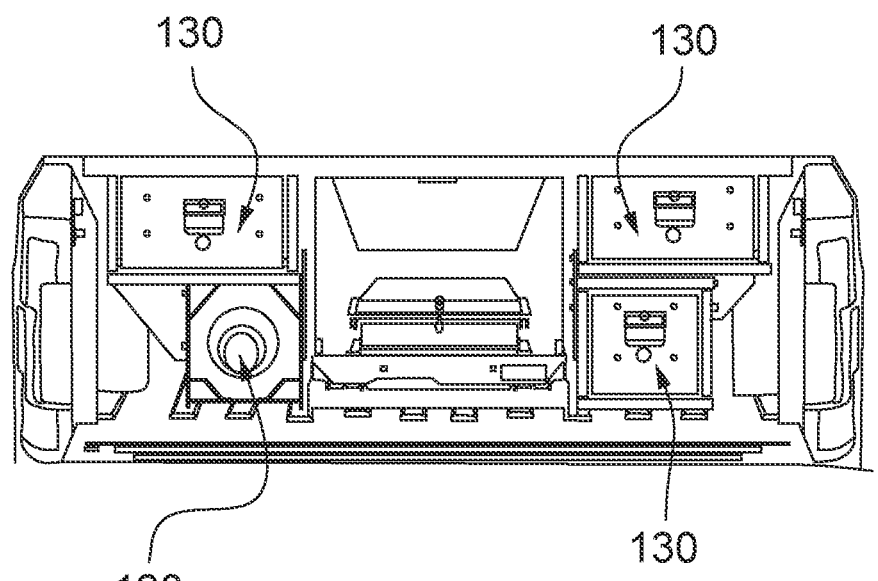
FIG. 6B illustrates inside view of the exemplary primary deck space management of the utility deck storage device by providing pluralities of slidable drawers, trays, removable storage boxes and space for storing cylindrical objects, in accordance with an embodiment of the present invention.
Figure 7A:
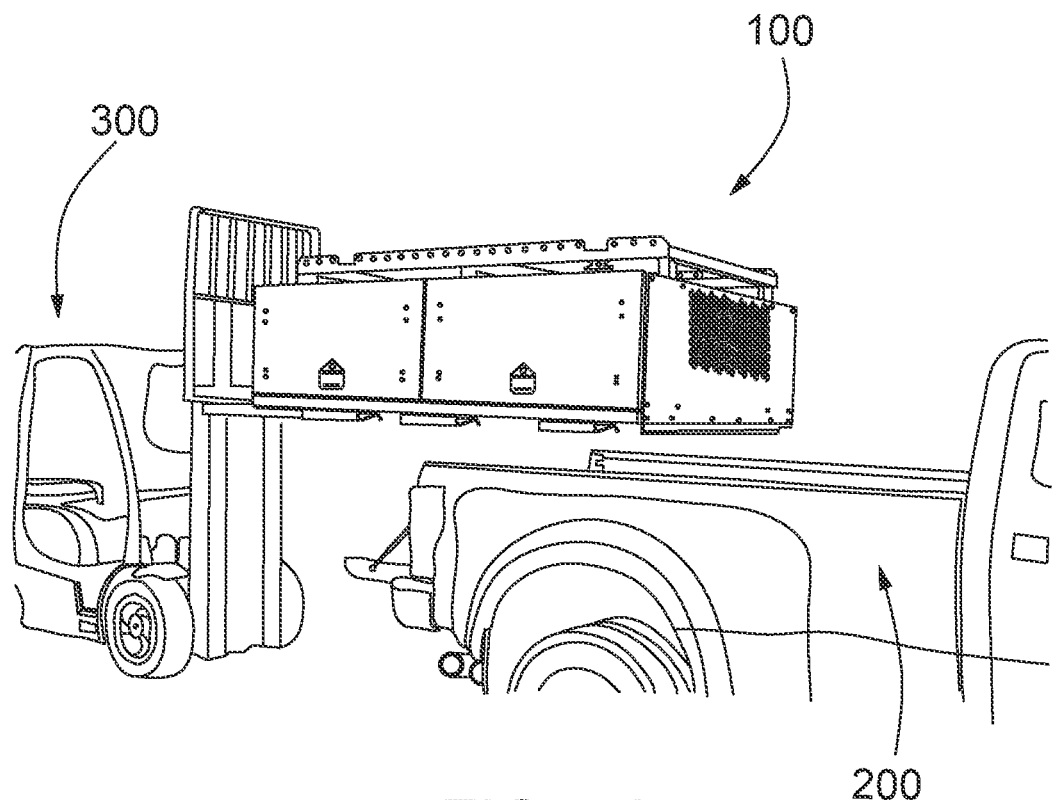
FIG. 7A illustrates a side perspective view of the exemplary quick mounting method of the utility deck storage device on top of bed rails of the vehicle using a forklift, in accordance with an embodiment of the present invention.
Figure 7B:
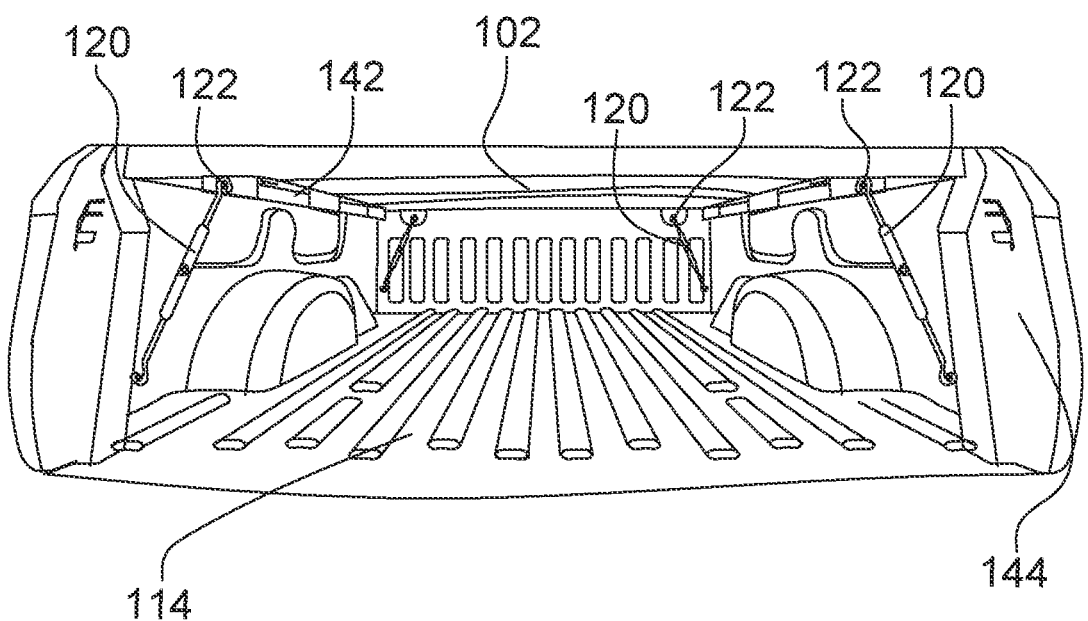
FIG. 7B illustrates an inside view of the exemplary attachment of turnbuckles to four corners of the bottom surface of the utility deck storage device, in accordance with an embodiment of the present invention.

According to several embodiments as shown in FIGS. 1A-7B, the present invention discloses a utility deck storage device 100 of the present invention is designed to convert the tailgate 114 of the vehicle 200 such as a pickup truck into a versatile storage solution, specifically targeting the work truck industry. The utility deck storage device 100 comprises a load bearing bed cover 102, storage boxes 104, headache rack 106, a primary deck 108, and a secondary deck 110. Bed cover 102 is configured to detachably mount on the bed rails 112 of the vehicle 200. The storage boxes 104 are mounted to the top of the bed cover 102 on the passenger side 105a and driver side 105b, leaving space for cargo on top of the bed cover 102 between the boxes 104 to act as a secondary deck 110, while the bed cover 102 covering the space between the bed cover 102 and the Original Equipment Manufacturer (OEM) tailgate 114 to turn the space into a primary deck 108 to provide a secured and covered storage space. The headache rack 106 is positioned between the boxes 104 on the cab side 105c, acting as a barrier to prevent stowed objects on the deck 110 from colliding with the cab of the vehicle 200. The primary deck 108 and the secondary deck 110 are provided with utility gates 116a-b respectively which are attached to the rear side 117 of the decks (108, 110), wherein the utility gates 116a-b are configured to hinge downward, opening access to the primary and secondary deck area (108, 110). The utility gates 116a-b are provided with suitable locking mechanism 118 to provide selective access to the primary and secondary decks (108, 110). The lower portion of the utility deck storage device 100 that is the bed cover 102 is secured to the vehicle 200 by four turnbuckles 120 attached to the four tie down points 122 in each corner of the pickup bed of the vehicle 200 as shown in FIG. 7B.

According to an aspect of the present invention as shown at least in FIGS. 1A-B, 2A-C, 4A and 6A, a detachable utility deck storage device 100 for a vehicle 200, wherein the utility deck storage device 100 comprises: a bed cover 102, wherein the bed cover 102 is configured to detachably mounted on bed rails 112 of the vehicle 200; one or more storage boxes 104, wherein the storage boxes 104 are mounted to the top of the bed cover 102 on passenger side 105a and driver side 105b, leaving space for cargo on top of the bed cover 102 between the boxes 104 to act as a secondary deck 110, further, the bed cover 102 acts as a roof to cover the space over OEM tailgate 114 of the vehicle 200 to turn the space into a primary deck 108 to provide a weather proof and covered storage space, whereby an OEM utility gate 116b allows secured access to the cargo from the primary deck 108; at least one utility gate 116a attached to the rear side 117 of the secondary deck 110; a headache rack 106, wherein the headache rack 106 (FIGS. 2A-C) is positioned between the boxes 104 on cab side 105c of the vehicle 200, acting as a barrier to prevent stowed objects on the deck 110 from colliding with the cab of the vehicle 200; and at least four turnbuckles 120 (FIG. 7B) detachably attached to the four tie-down points 122 in each corner of the bed cover 102 of the vehicle 200 at the lower portion of the utility storage deck device 100 to provide detachable attachment of the utility storage deck device 100 to the vehicle 200.

Figure 1A:
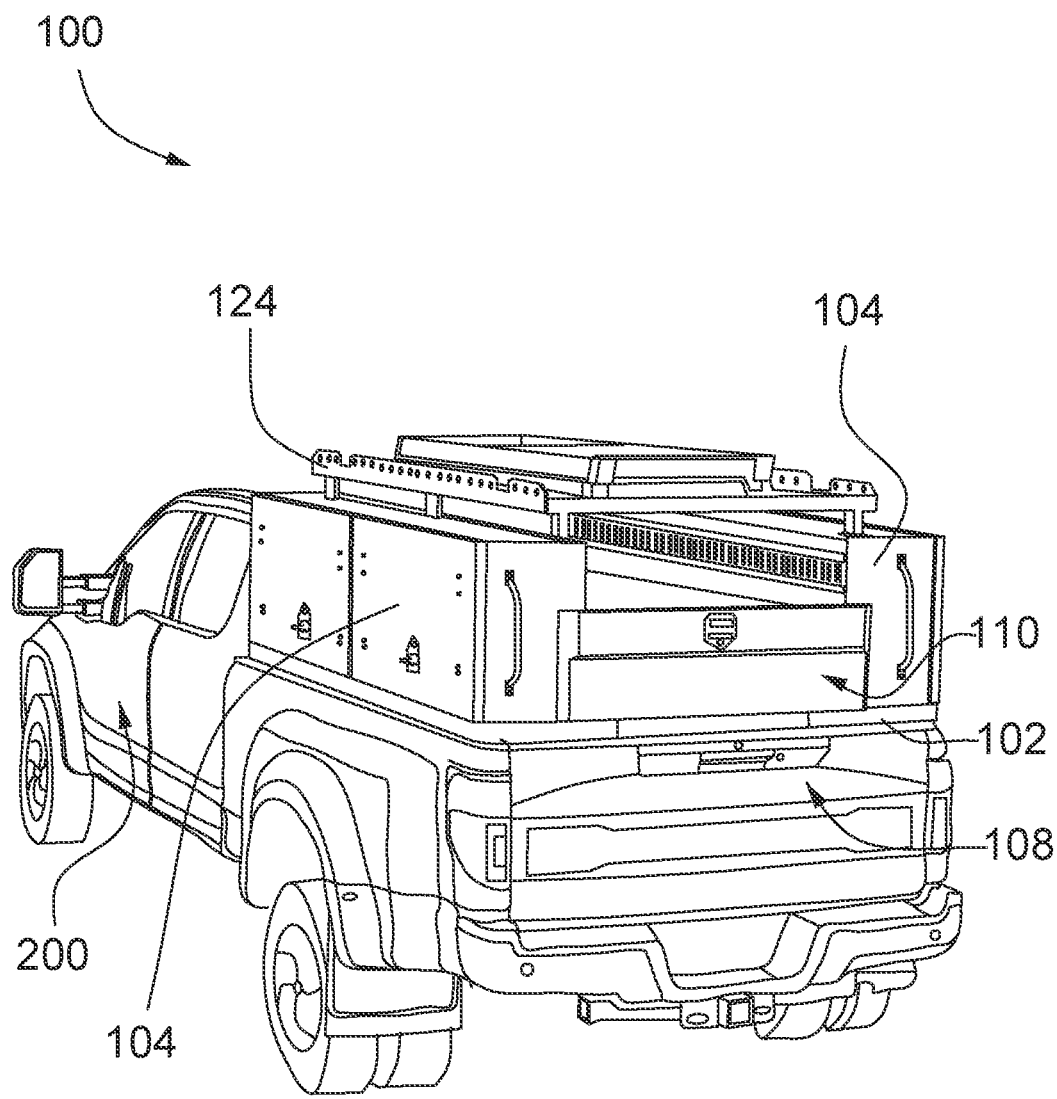
FIG. 1A illustrates a back perspective view of an exemplary utility deck storage device loaded on a vehicle, in accordance with an embodiment of the present invention.
Figure 1B:
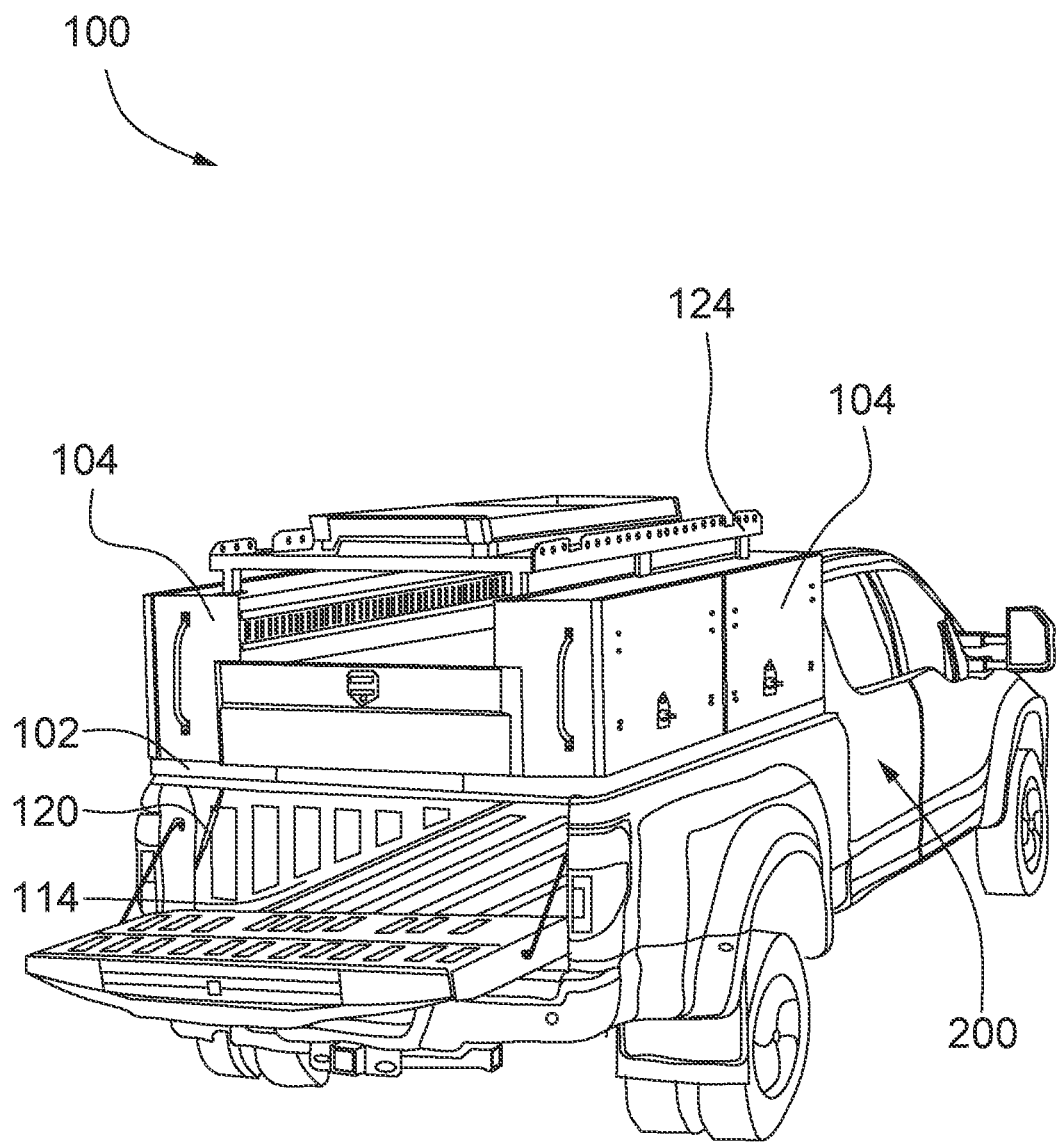
FIG. 1B illustrates a back perspective view of the exemplary utility deck storage device loaded on a vehicle with primary deck open and secondary deck closed condition, in accordance with an embodiment of the present invention.
Figure 2A:
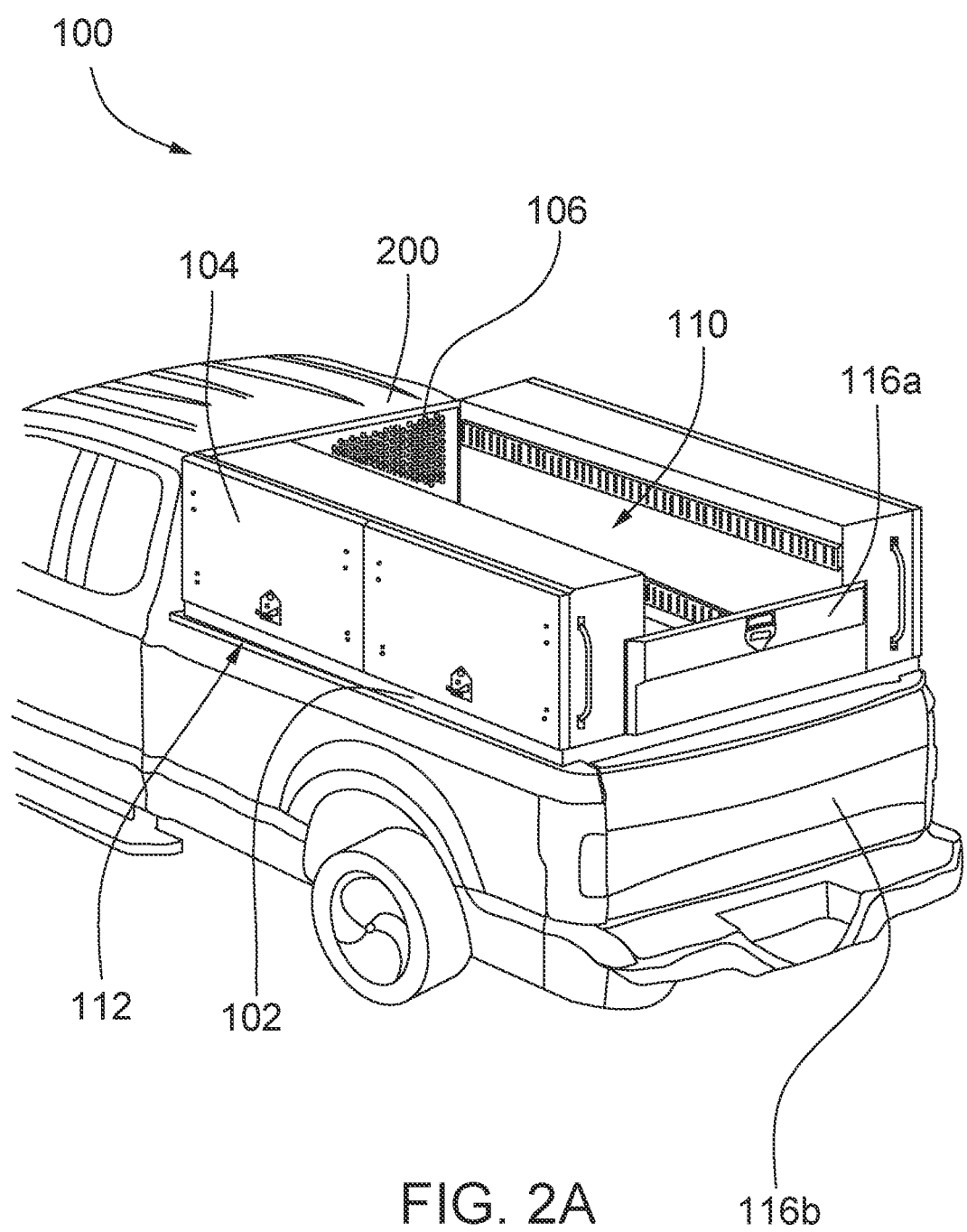
FIG. 2A illustrates a top perspective view of the exemplary utility deck storage device loaded on a vehicle showing storage boxes, a headache rack and utility gates, in accordance with an embodiment of the present invention.
Figure 2B:
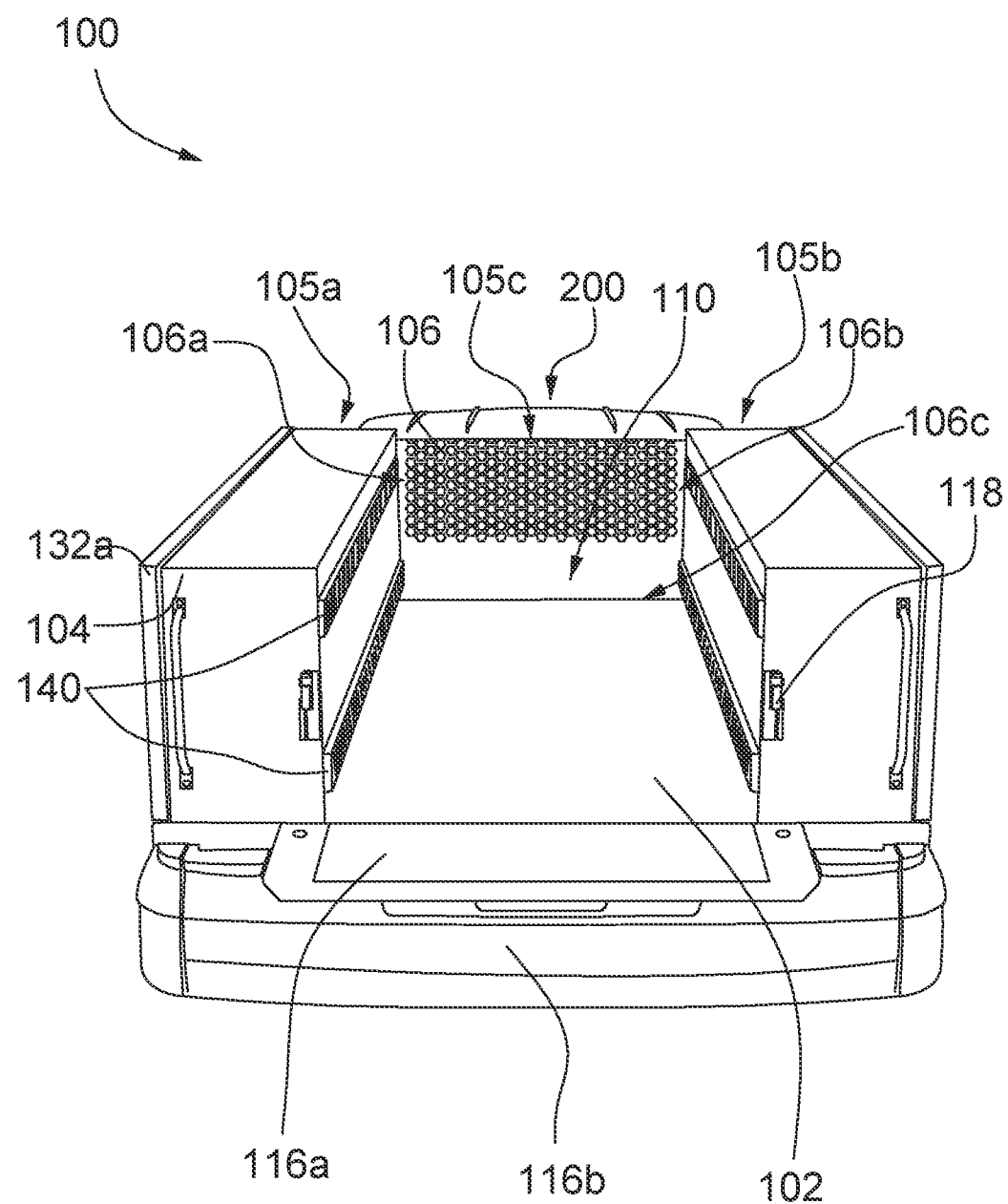
FIG. 2B illustrates a back view of a slot of exemplary utility deck storage device loaded on a vehicle showing rear visibility through the headache rack and the secondary deck, in accordance with an embodiment of the present invention.

According to another aspect of the present invention as shown at least in FIG. 2B, the utility gate 116*a* is provided with locking mechanism 118.

According to another aspect of the present invention as shown at least in FIGS. 1A-B, 5A-B, device 100 comprises a cargo rack 124, whereby the cargo rack 124 is provided with hex punches 125.

Figure 4A:
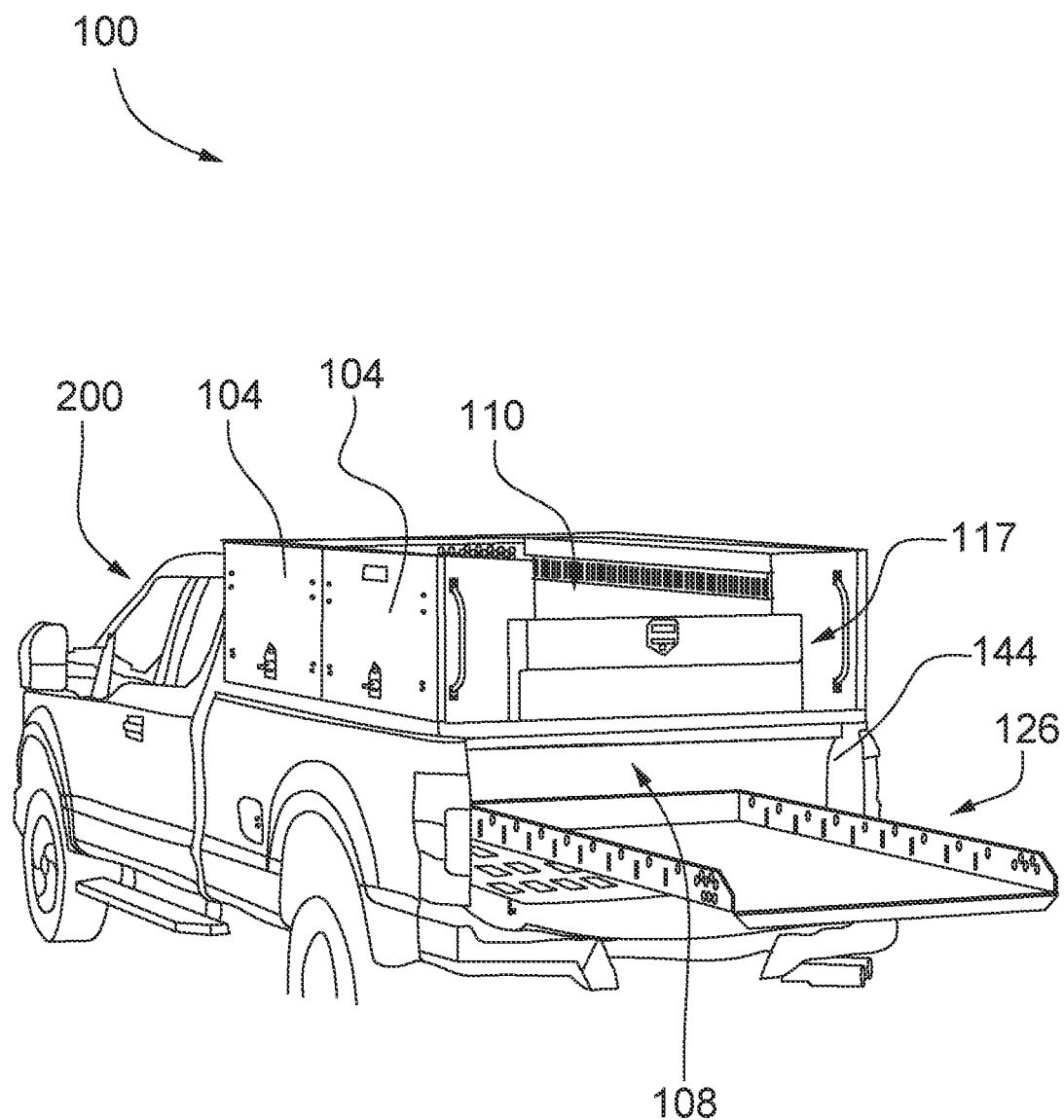
FIG. 4A-B illustrates a back perspective view of the exemplary utility deck storage device loaded on a vehicle showing slidable tray and other compartments accessibly placed in the primary deck, in accordance with an embodiment of the present invention.
Figure 4B:
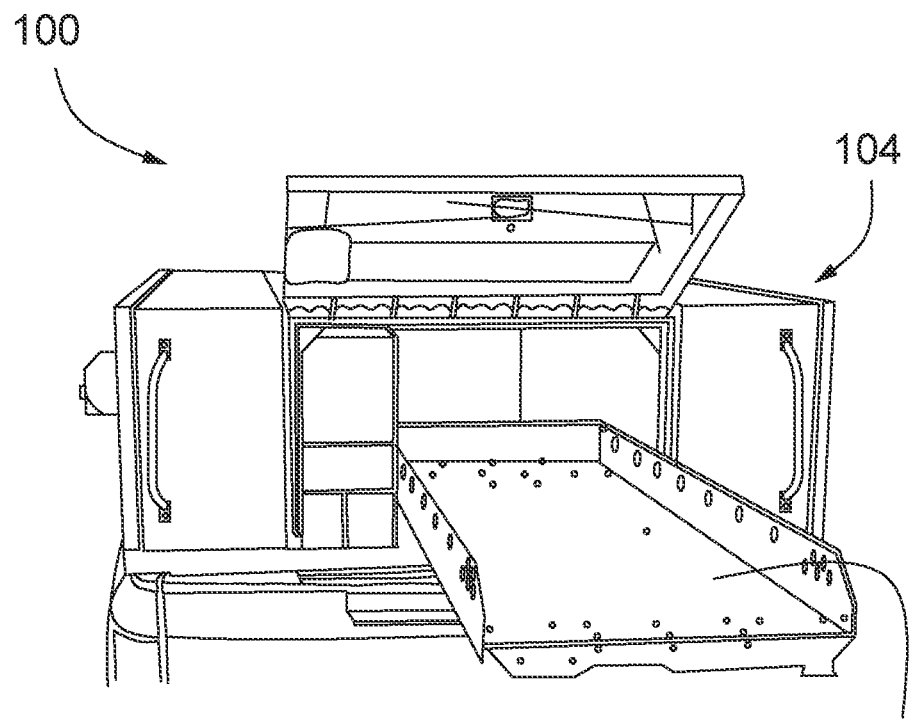
Figure 4C:
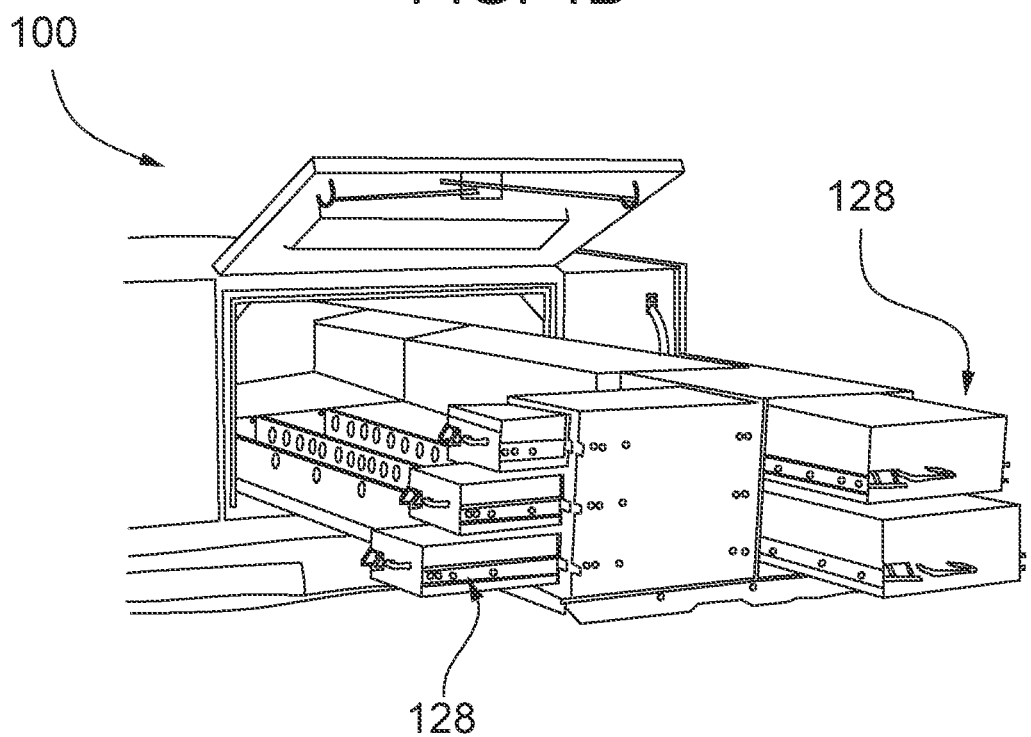
FIG. 4C illustrates a back view of the exemplary utility deck storage device comprising slidable, easily accessible trays, drawer and removable storage boxes that allows materials to be contained inside them and can be easily accessed, in accordance with an embodiment of the present invention.

According to another aspect of the present invention as shown at least in FIGS. 4A-C, device 100 comprises slidable trays 126, drawers 128, removable storage boxes 130.

According to another aspect of the present invention as shown at least in FIG. 6A, device 100 comprises at least one basket 134 mounted over the storage boxes 104, whereby the basket 134 is provided with hex punches 136.

According to another aspect of the present invention as shown at least in FIG. 6B, device 100 comprises storage space for cylindrical objects 138.

According to another aspect of the present invention as shown at least in FIGS. 2A-C and 6A, the secondary deck 110 is an open deck.

Figure 5A:
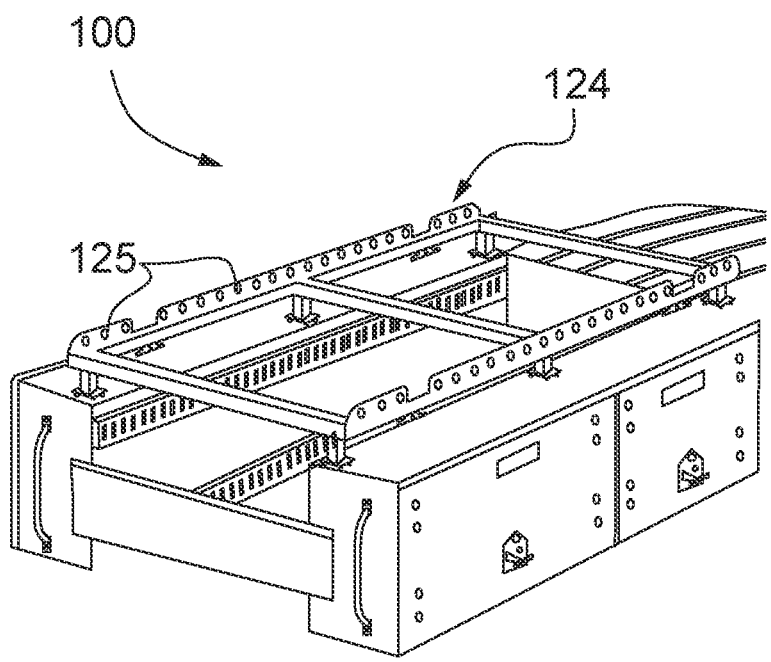
FIG. 5A illustrates a back perspective view of the exemplary utility deck storage device comprising a detachably attached overhead rack, in accordance with an embodiment of the present invention.
Figure 5B:
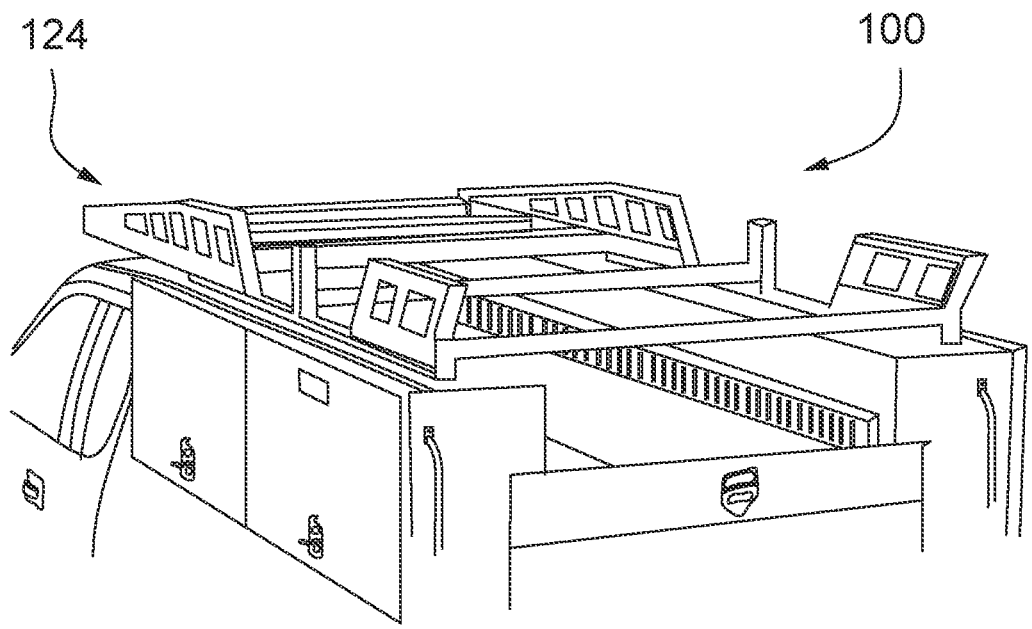
FIG. 5B illustrates a back perspective view of the exemplary utility deck storage device comprising a detachably attached lumber rack, in accordance with an embodiment of the present invention.

According to another aspect of the present invention as shown at least in FIGS. 5A-B, the utility deck storage device 100 is configured with detachable overhead racks 124 selected from a group consisting of cargo rack, a ladder rack and/or a heavy-duty lumber rack, whereby the cargo rack 124 is provided with several slots 125 along the length of the rack 124 to provide accessible tie down points to hold the cargo in place.

According to another aspect of the present invention as shown at least in FIGS. 3A-D, the boxes 104 above the utility deck storage device 100 are provided with configurable, detachable, and lockable quick and easy access doors 132*a-c*.

Figure 2C:
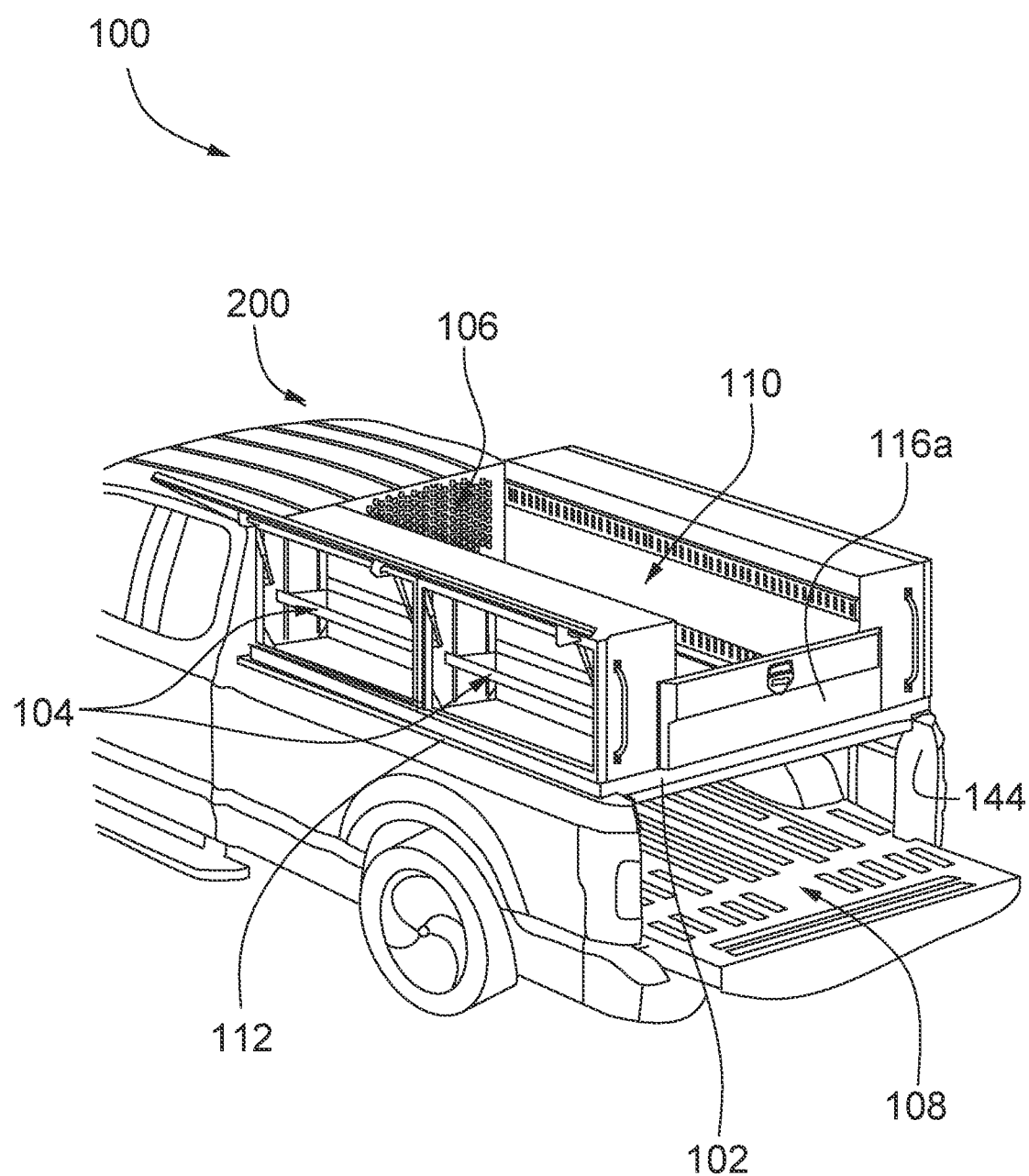
FIG. 2C illustrates a left side top perspective view of the exemplary utility deck storage device loaded on a vehicle showing storage boxes and primary deck in open condition, a headache rack, and secondary deck in closed condition, in accordance with an embodiment of the present invention.
Figure 3A:
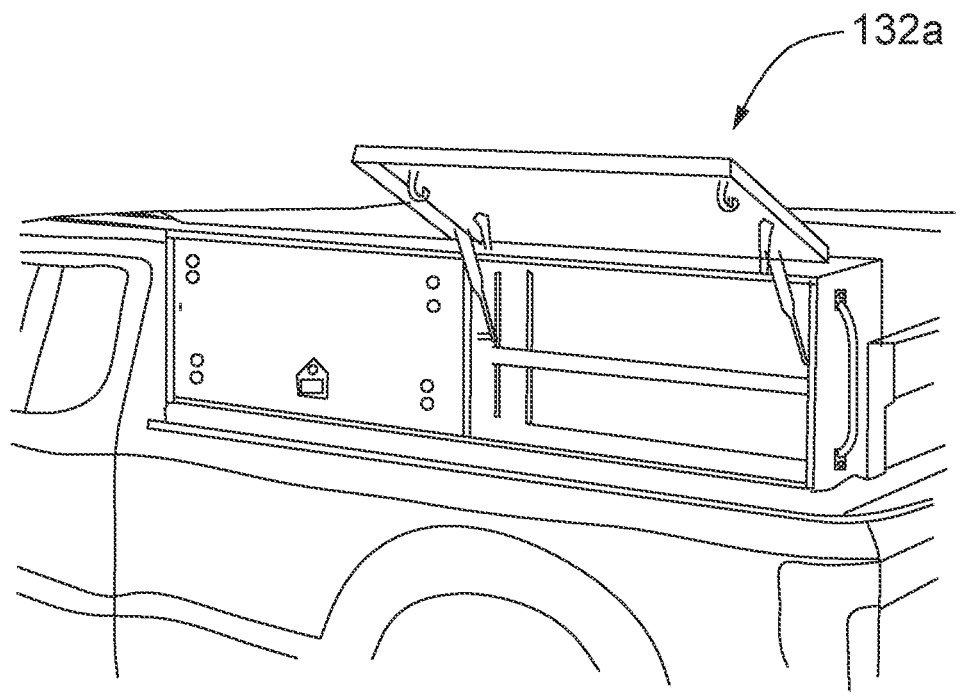
FIG. 3A-D illustrate side perspective views of the exemplary utility deck storage device having storage boxes and its different access mechanisms, in accordance with an embodiment of the present invention.
Figure 3B:
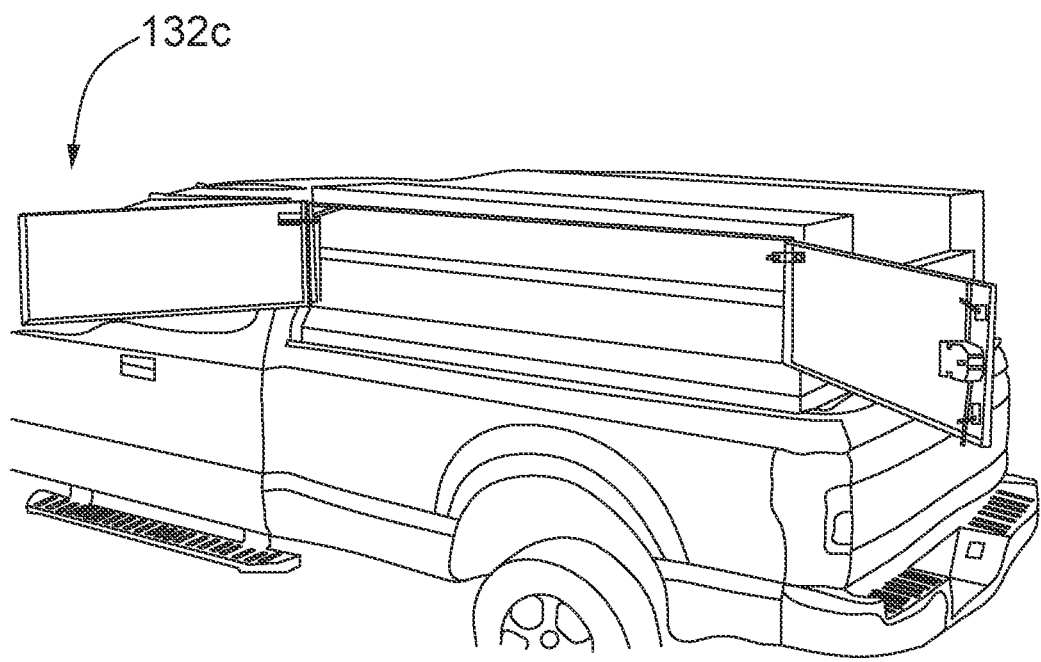
Figure 3C:
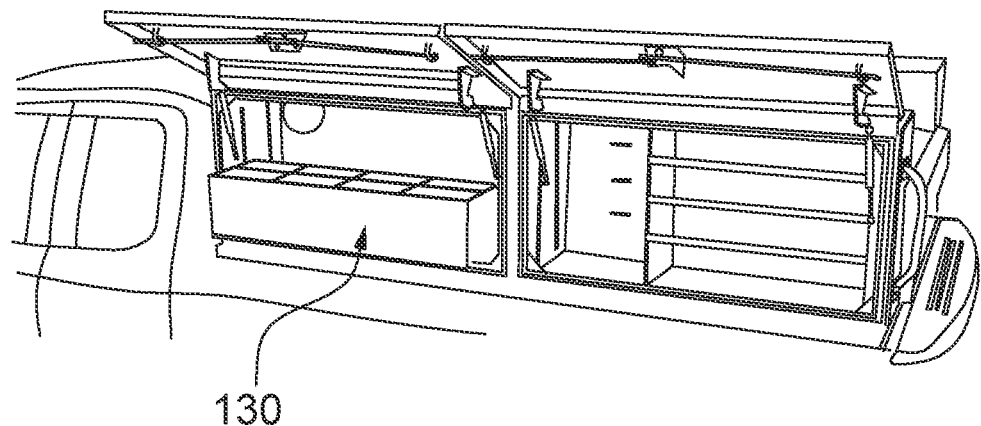
Figure 3D:
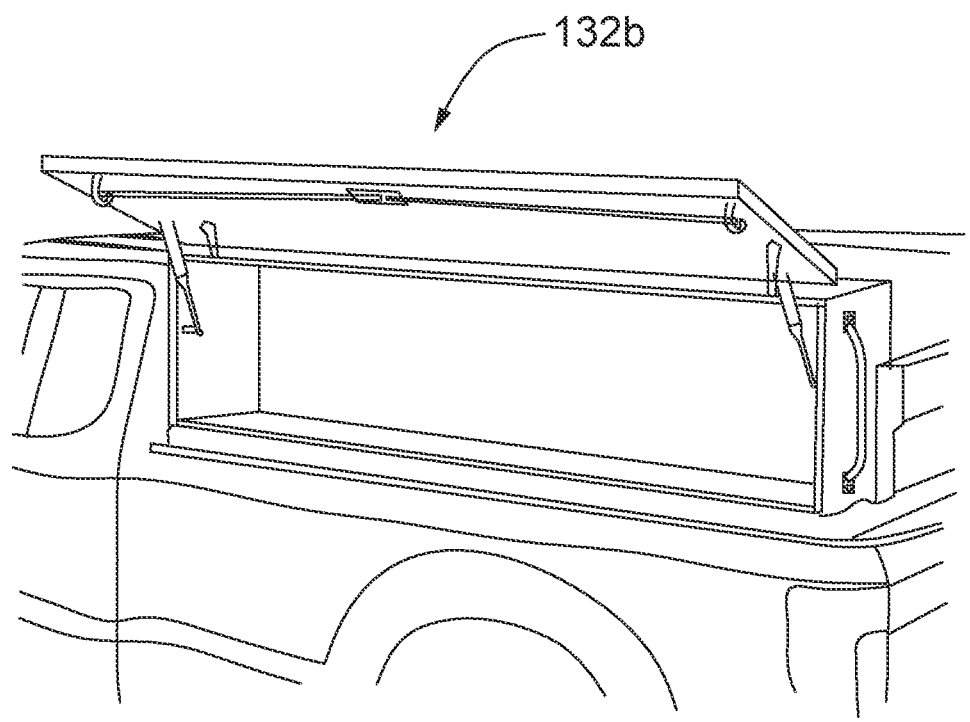

According to another aspect of the present invention as shown at least in FIG. 2B-C, the boxes 104 above the utility deck storage device 100 are provided with at least one double e-track 140 along the length of the interior side of the storage boxes 104 to function as versatile tie down points for securing cargos and accessories.

According to another aspect of the present invention as shown at least in FIG. 7B, a plurality of access panels 142 are provided under the storage boxes 104 to allow easy-to-reach installation of the turnbuckles 120 to avoid crawling into bed of the vehicle 200.

According to another aspect of the present invention, a pack of closed-cell foam (not shown) is used to prevent water from entering beneath the utility deck storage device 100 and above the bed rails 112, and a pair of rear angle foam packs 144 (FIGS. 2C, 4A, 7B) positioned on either side of utility gate 116*b* that seals against the OEM tailgate 116*b* of the vehicle 200.

According to another aspect of the present invention as shown at least in FIG. 7A, the utility deck storage device 100 is configured to provide quick assembly and disassembly from the vehicle 200 with the help of a pulley and chain arrangement or a forklift 300.

According to another aspect of the present invention as shown in FIGS. 1A-7B, a detachable utility deck storage device 100 for a vehicle 200, wherein the utility deck storage device 100 comprises: a bed cover 102, wherein the bed cover 102 is configured to detachably mounted on bed rails 112 of the vehicle 200; one or more storage boxes 104 with lockable doors 132*a-c*, wherein the storage boxes 104 are mounted to the top of the bed cover 102 on passenger side 105*a* and driver side 105*b*, leaving space for cargo on top of the bed cover 102 between the boxes 104 to act as a secondary deck 110, further, the bed cover 102 acts as a roof to cover the space over OEM tailgate 114 of the vehicle 200 to turn the space into a primary deck 108 comprising slidable trays 126, drawers 128, removable storage boxes 130 and storage space for cylindrical objects 138 so as to provide a weather proof and covered and easily accessible storage space for the cargo and accessories, whereby an OEM utility gate 116*b* allows secured access to the cargo from the primary deck 108, further at least one double e-track 140 along the length of the interior side of the storage boxes 104 to act as versatile tie down points for securing cargos and accessories; at least one lockable utility gate 116*a* attached to the rear side 117 of the secondary deck 110; a headache rack 106, wherein the headache rack 106 is positioned between the boxes 104 on cab side 105*c* of the vehicle 200, acting as a barrier to prevent stowed objects on the deck 110 from colliding with the cab of the vehicle 200; at least one basket 134 mounted over the storage boxes 104, wherein the basket 134 is provided with hex punches 136; a cargo rack 124, wherein the cargo rack 124 is provided with hex punches 125; a pack of closed-cell foam (not shown) provided between the bed cover 102 and the bed rails 112, and a pair of rear angle foam packs 144 positioned on either side of the utility gate 116*b* to prevent water entering the primary deck 108; grip area (not shown) along the bed cover 102 allows the utility deck storage device 100 to quickly assemble and disassemble from the vehicle 200 with the help of a pulley and chain arrangement or a forklift 300; and at least four turnbuckles 120 detachably attached to the four tie-down points 122 in each corner of the bed cover 102 of the vehicle 200 at the lower portion of the utility storage deck device 100 to provide detachable attachment of the utility storage deck device 100 to the vehicle 200, wherein a plurality of access panels 142 are provided under the storage boxes 104 to allow easy-to-reach installation of the turnbuckles 120 to avoid crawling into bed of the vehicle 200.

According to another aspect of the present invention, the secondary deck 110 is provided with a roof enclosing the storage space between the boxes to form an enclosed space in the secondary deck 110 to form a closed deck, whereby the roof above the secondary deck 110 acts as an additional platform for objects to be stowed above the roof of the secondary deck 110.

According to an exemplary embodiment of the present invention as shown in FIGS. 2A-2B, the utility deck storage device 100 comprises a headache rack 106 attached to the bedcover 102 of the device 100 at the cab side 117 of the vehicle 200 to provide protection to the cab while allowing rear visibility through the headache rack 106. Further the top-mounted storage boxes 104 are fixedly joined on side edges 106*a-b* of the headache rack 106 and the bottom edge 106*c* of the headache rack 106 are fixedly attached to the top surface of the bed cover 102, wherein the bed cover 102 acts as a bottom surface of the utility deck storage device 100 to bear the load of the storage boxes 104, the headache rack 106, cargo rack 124 and cargo (not shown). The top mounted boxes 104, the headache rack 106, and the bed cover 102 create a space that is self-contained to place many objects in that space without the objects necessarily being tied down. As shown in FIG. 2B, the space is enclosed at the rear side with a pivotable utility gate 116*a* for rear access, effectively turning the product into a truck cap/truck canopy with an open secondary deck 110 over the enclosed primary deck 108, while the rear access utility gate 116*a* rests horizontally when in open position to extend the usable space while accessing the cargo from the secondary deck 110.

Further as shown in FIGS. 2A-C, the primary deck 108 is originally provided with a rear access utility gate 116b by the vehicle manufacturer, that allows the usable space of the primary deck 108 to act as a weather proof storage space when the utility deck storage device 100 of the present invention is installed on the bed rails 112 of the vehicle 200, further it allows secured access of the cargo from the primary deck 108.

Further according to another embodiment of the present invention, the space created by the top mounted boxes 104, the headache rack 106, and the bed cover 102 is provided with a roof enclosing the storage space between the boxes to form an enclosed space in the secondary deck 110. The secondary deck 110 is provided with a door for rear access, effectively turning the product into a truck cap/truck canopy with the secondary deck 110, separating the contents/cargo below the secondary deck 110 from the primary deck 108, while providing an additional platform for objects to be stowed above the roof of the secondary deck 110 as illustrated in the FIG. 4A.

According to an exemplary embodiment of the present invention, the utility deck storage device 100 comprises storage boxes 104 that are mounted on top of the bed cover 102 or tonneau cover of the vehicle 200, thereby allowing the full space of the deck of the vehicle 200 to be converted into a utility deck storage space for optimum utilization of the deck storage space. The utility deck storage device 100 further comprises slidable, easily accessible trays, drawer, and removable storage boxes 130 that allows easy access of the materials contained within as shown in FIG. 4A-C.

According to another embodiment of the present invention as shown in FIG. 3A-D, the boxes 104 above the utility deck storage device 100 are provided with side-access storage doors 132a for organized storage and easy access to additional equipment, tools, etc. Without limitation the boxes 104 are provided with other access mechanisms including but not limited to double lift doors 132a, single lift doors 132b, barn doors 132c, slidable doors (not shown) and the like.

According to another embodiment of the present invention as shown in FIGS. 5A-B, the utility deck storage device 100 can be configured and customized with overhead racks 124 such as cargo rack, a ladder rack and/or a heavy-duty lumber rack, for lumber, pipes, and more. Further the members of rack 124 are provided with several slots 125 or tie down mechanisms that run the length of the rack 124 to provide accessible tie down points to hold the cargo in place. Overhead racks 124 are removable for storage of taller items on the utility deck storage device 100.

According to another exemplary embodiment of the present invention as shown in FIG. 6A, the utility deck storage device 100 of the present invention comprises additional provisions for storage space by providing one or more baskets 134 to the top of the utility storage boxes 104 to create open top storage on either side of the utility deck storage device 100. The baskets 134 as hex punched throughout to provide proper ventilation to the cargo stored in the basket 134 and further the hex punches 136 along the baskets allows to easily tie loads down or secure items directly to the basket 134.

According to another exemplary embodiment of the present invention as shown in FIG. 6B, the utility deck storage device 100 of the present invention comprises additional provisions for storage space by providing one or more space for storing cylindrical objects 138 such as to stow oxygen, cooking gas and other gas tanks in the primary deck 108 of the utility deck storage device 100 and access easily when needed.

Further several slidable drawers 128, trays 126 and vise mounts are provided at the primary and secondary deck (108, 110) to provide organized storage and easy access to the contents, tools, equipments and accessories. According to another exemplary embodiment, at least one large enclosed pull-out drawer 128 is provided either in the primary deck 108 or the secondary deck 110 or both to store ample organized, secure, and weatherproof storage, further one or more add in removable dividers/boxes 130 are provided for easy handling and organization of the contents, tools, equipment, and accessories.

According to another exemplary embodiment of the present invention as shown in FIG. 7A, the utility deck storage device 100 of the present invention is configured to be quickly deployed to convert a pickup truck 200 into having highly functional secure storage capabilities, like a service body, without removing the OEM bed. Compared to a service body, the installation time for the utility deck storage device 100 of the present invention is extremely fast and non-invasive. There is no requirement of drilling, rerouting fuel lines, or rerunning lights; the customer can also retain certain in-built bed technology in some specialized vehicles, which would otherwise become obsolete when the bed is removed. The utility deck storage device 100 of the present invention can be configured by adding assorted options to change the storage space for unique customer applications and requirements. There are many more truck options available for the product compared to service bodies. The utility deck storage device 100 of the present invention can be installed on any truck.

According to another exemplary embodiment of the present invention as shown in FIG. 7A, the utility deck storage device 100 of the present invention is quickly and detachably mounted to the top of the bed cover 102 without disturbing the OEM tailgate configuration. There is no need to remove the tailgate bed, reroute fuel lines, or run wiring for lights. Factory sensors and cameras can remain in their original positions, and even retain other technology provided by the OEM, in-bed lighting, and inverters that would otherwise become obsolete with bed replacements. The lower portion of the deck, which is the bed cover 102 is secured to the vehicle 200 by at least four turnbuckles 120 attached to the four tie-down points 122 in each corner of the bed cover 102 of the vehicle as shown in FIG. 7B. Other quick mounting mechanisms can be used without departing from the scope and the spirit of the present invention.

According to another exemplary embodiment of the present invention as shown in FIG. 5B, a double e-track 140 positioned high and low runs the entire length of the interior of the storage boxes 104 and delivers versatile tie down points and other e-track accessories like ladder hooks or storage bins.

According to another exemplary embodiment of the present invention as shown in FIG. 7B, plurality of access panels 142 under the storage boxes 104 are provided to allow easy-to-reach installation of the turnbuckles 120 to avoid crawling into bed of the vehicle 200, further it allows quick transfer of the entire utility deck storage device 100 of the present invention to the next truck.

According to another exemplary embodiment of the present invention as shown in FIG. 7B, closed-cell foam (not shown) is used to prevent water from entering beneath the utility deck storage device 100 and above the bed rails 112, and a rear angle foam packs 144 positioned on either side of the utility gate 116b that seals against the factory bed's tailgate.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A detachable utility deck storage device for a vehicle, wherein the utility deck storage device comprises: a bed cover, wherein the bed cover is configured to be detachably mounted on bed rails of the vehicle; one or more storage boxes, wherein the storage boxes are mounted to a top of the bed cover on a passenger side and a driver side, leaving space for cargo on top of the bed cover between the boxes to act as a secondary deck, further, the bed cover acts as a roof to cover the space over a tailgate of the vehicle to turn the space into a primary deck to provide a weather proof and covered storage space, whereby the tailgate allows secured access to the cargo from the primary deck; at least one utility gate attached to the rear side of the secondary deck; a headache rack, wherein the headache rack is positioned between the boxes on a cab side of the vehicle, acting as a barrier to prevent stowed objects on the secondary deck from colliding with the cab of the vehicle; and at least four turnbuckles detachably attached to the four tie-down points in each corner of the bed cover of the vehicle at a lower portion of the utility storage deck device to provide detachable attachment of the utility storage deck device to the vehicle.

2. The utility deck storage device of claim 1, wherein the utility gate is provided with locking mechanism.

3. The utility deck storage device of claim 1, wherein the device comprises a cargo rack, whereby the cargo rack is provided with hex punches.

4. The utility deck storage device of claim 1, wherein the device comprises slidable trays, drawers, and removable storage boxes.

5. The utility deck storage device of claim 1, wherein the device comprises at least one basket mounted over the storage boxes, whereby the basket is provided with hex punches.

6. The utility deck storage device of claim 1, wherein the device comprises storage space for cylindrical objects.

7. The utility deck storage device of claim 1, wherein the secondary deck is an open deck.

8. The utility deck storage device of claim 1, wherein the utility deck storage device is configured with detachable overhead racks selected from a group consisting of cargo rack, a ladder rack, and a heavy-duty lumber rack, whereby the cargo rack is provided with several slots along the length of the rack to provide accessible tie down points to hold the cargo in place.

9. The utility deck storage device of claim 1, wherein the boxes above the utility deck storage device are provided with configurable access doors.

10. The utility deck storage device of claim 1, wherein the boxes above the utility deck storage device are provided with at least one double e-track along the length of an interior side of the storage boxes to function as a versatile tie down point for securing cargo and accessories.

11. The utility deck storage device of claim 1, wherein a plurality of access panels are provided under the storage boxes to allow easy-to-reach installation of the turnbuckles to avoid crawling into bed of the vehicle.

12. The utility deck storage device of claim 1, wherein a pack of closed-cell foam is used to prevent water from entering beneath the utility deck storage device and above the bed rails, and a pair of rear angle foam packs positioned on either side of the utility gate that seals against the tailgate of the vehicle.

13. The utility deck storage device of claim 1, wherein the utility deck storage device is configured to provide quick assembly and disassembly from the vehicle with the help of a pulley and chain arrangement or a forklift.

14. A detachable utility deck storage device for a vehicle, wherein the utility deck storage device comprises: a bed cover, wherein the bed cover is configured to detachably mounted on bed rails of the vehicle; one or more storage boxes with lockable doors, wherein the storage boxes are mounted to a top of the bed cover on a passenger side and a driver side, leaving space for cargo on top of the bed cover between the boxes to act as a secondary deck, further, the bed cover acts as a roof to cover the space over a tailgate of the vehicle to turn the space into a primary deck comprising slidable trays, drawers, removable storage boxes and storage space for cylindrical objects so as to provide a weather proof and covered and easily accessible storage space for the cargo and accessories, whereby the tailgate allows secured access to the cargo from the primary deck, further, at least one double e-track along the length of an interior side of the storage boxes to act as a versatile tie down point for securing cargo and accessories; at least one lockable utility gate attached to the rear side of the secondary deck; a headache rack, wherein the headache rack is positioned between the boxes on a cab side of the vehicle, acting as a barrier to prevent stowed objects on the secondary deck from colliding with the cab of the vehicle; at least one basket mounted over the storage boxes, wherein the basket is provided with hex punches; a cargo rack, wherein the cargo rack is provided with hex punches; a pack of closed-cell foam provided between the bed cover and the bed rails, and a pair of rear angle foam packs positioned on either side of the tailgate to prevent water entering the primary deck; grip area along the bed cover allows the utility deck storage device to quickly assemble and disassemble from the vehicle with the help of a pulley and chain arrangement or a forklift; and at least four turnbuckles detachably attached to the four tie-down points in each corner of the bed cover of the vehicle at a lower portion of the utility storage deck device to provide detachable attachment of the utility storage deck device to the vehicle, wherein a plurality of access panels are provided under the storage boxes to allow easy-to-reach installation of the turnbuckles to avoid crawling into bed of the vehicle.

15. The utility deck storage device of claim 14, wherein the secondary deck is provided with a roof enclosing the storage space between the boxes to form an enclosed space in the secondary deck to form a closed deck, whereby the roof above the secondary deck acts as an additional platform for objects to be stowed above the roof of the secondary deck.

* * * * *